US009545913B2

(12) United States Patent
Bowman et al.

(10) Patent No.: US 9,545,913 B2
(45) Date of Patent: Jan. 17, 2017

(54) METHOD AND APPARATUS FOR CONTROLLING A POWERTRAIN SYSTEM INCLUDING MULTIPLE TORQUE-GENERATIVE DEVICES

(71) Applicant: GM GLOBAL TECHNOLOGY OPERATIONS LLC, Detroit, MI (US)

(72) Inventors: Shaun C. Bowman, Ann Arbor, MI (US); Poh Fong Chin, Novi, MI (US); Jeremy Wise, Novi, MI (US); Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 14/663,550

(22) Filed: Mar. 20, 2015

(65) Prior Publication Data

US 2016/0272188 A1   Sep. 22, 2016

(51) Int. Cl.
| | |
|---|---|
| B60W 20/40 | (2016.01) |
| B60W 10/115 | (2012.01) |
| B60W 10/08 | (2006.01) |
| B60W 10/06 | (2006.01) |
| B60W 20/00 | (2016.01) |

(52) U.S. Cl.
CPC .............. *B60W 20/10* (2013.01); *B60W 10/06* (2013.01); *B60W 10/08* (2013.01); *B60W 10/115* (2013.01); *B60W 20/40* (2013.01); *Y10S 903/93* (2013.01); *Y10T 477/23* (2015.01)

(58) Field of Classification Search
None
See application file for complete search history.

(56) References Cited

U.S. PATENT DOCUMENTS

| | | | |
|---|---|---|---|
| 2009/0176610 A1* | 7/2009 | Conlon ................ | B60K 6/365 475/5 |
| 2011/0015021 A1* | 1/2011 | Maguire ............... | B60K 6/365 475/8 |
| 2012/0004061 A1* | 1/2012 | Tiwari ................ | B60K 6/445 475/5 |
| 2014/0100076 A1 | 4/2014 | Bowman et al. | |
| 2014/0141915 A1 | 5/2014 | Naqi et al. | |
| 2015/0329101 A1* | 11/2015 | Trofimov ............. | B60W 20/10 701/22 |

* cited by examiner

*Primary Examiner* — Edwin A Young
*Assistant Examiner* — Timothy M Hannon
(74) *Attorney, Agent, or Firm* — Quinn Law Group, PLLC

(57) ABSTRACT

A powertrain system includes an internal combustion engine having a crankshaft that fixedly couples to an input member of a multi-mode transmission including first and second torque machines. The transmission operates in one of a plurality of fixed-gear modes and variable modes through selective activation of first and second clutches. A control method includes, in response to a command to operate the multi-mode transmission in a fixed-gear mode, activating only the first clutch and commanding the engine to an OFF state. The first torque machine is controlled to generate a first torque output responsive to a drag torque that is offset by an engine reactive torque with the engine in the OFF state. The transmission operates in the fixed-gear mode by controlling the second torque machine to generate a second torque output responsive to an operator torque request and the first torque output of the first torque machine.

15 Claims, 2 Drawing Sheets

METHOD AND APPARATUS FOR CONTROLLING A POWERTRAIN SYSTEM INCLUDING MULTIPLE TORQUE-GENERATIVE DEVICES

TECHNICAL FIELD

This disclosure relates to powertrain systems employing multiple torque-generative devices and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating mode and gear shifting, controlling the torque-generative devices, and regulating the electrical power interchange among the electrical energy storage device and the electric machines to manage outputs of the transmission, including torque and rotational speed.

SUMMARY

A powertrain system is described, and includes an internal combustion engine having a crankshaft that fixedly couples to an input member of a multi-mode transmission including first and second torque machines, wherein the multi-mode transmission is operative in one of a plurality of fixed-gear modes and variable modes through selective activation of first and second clutches. The method includes, in response to a command to operate the multi-mode transmission in a fixed-gear mode, activating only the first clutch and commanding the internal combustion engine to an OFF state. The first torque machine is controlled to generate a first torque output responsive to a drag torque, wherein the first torque output is offset by an engine reactive torque with the engine in the OFF state. The multi-mode transmission operates in the fixed-gear mode by controlling the second torque machine to generate a second torque output responsive to an operator torque request and the first torque output of the first torque machine.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
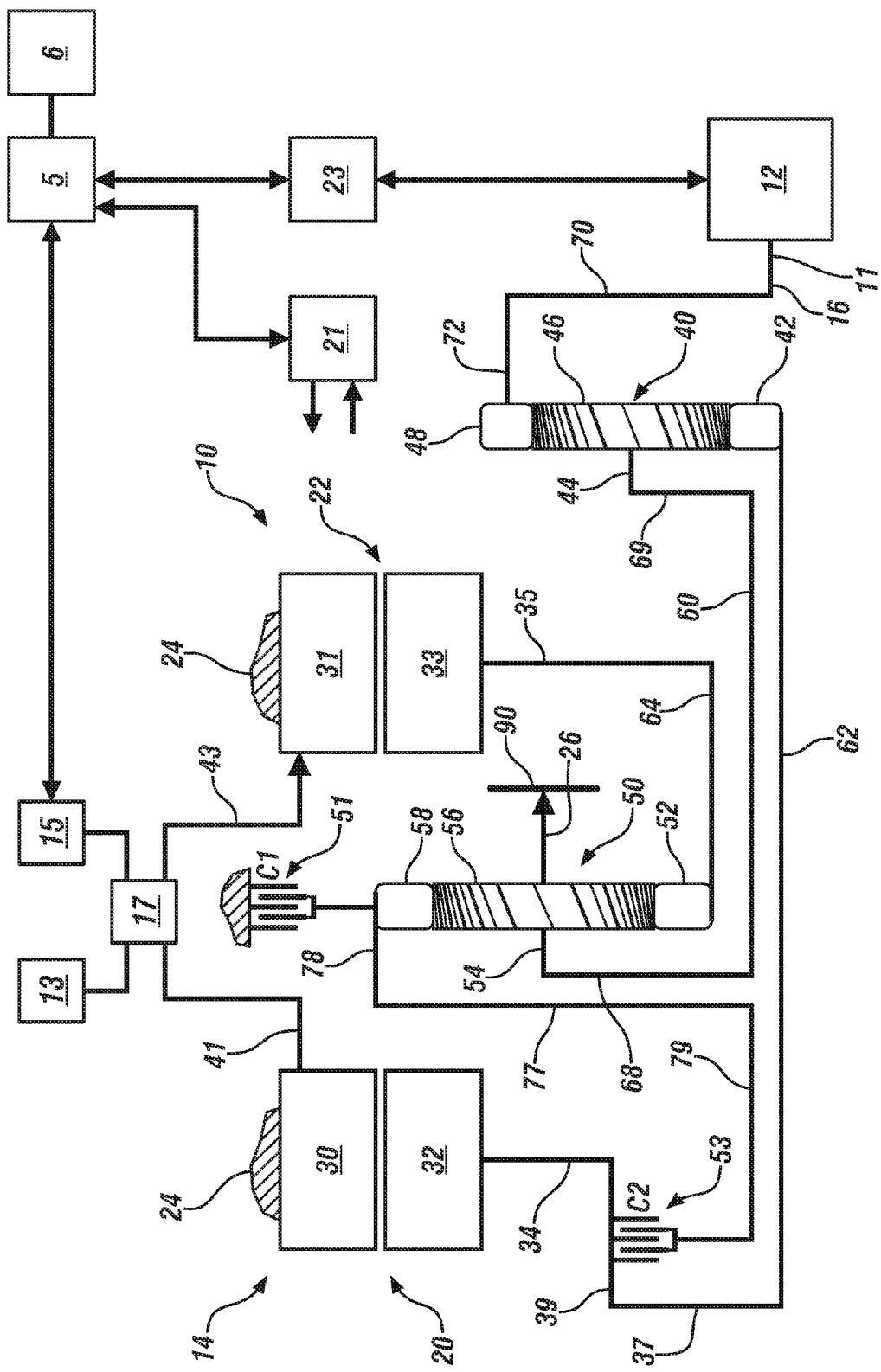
FIG. 1 schematically illustrates a powertrain system that includes an internal combustion engine and multi-mode transmission that couples to a driveline, the operation of which is controlled by a hybrid control module, in accordance with the disclosure.

Referring now to the drawings, wherein the showings are for the purpose of illustrating certain exemplary embodiments only and not for the purpose of limiting the same, FIG. 1 schematically illustrates elements of a powertrain system 10 including an internal combustion engine (engine) 12 and multi-mode transmission (transmission) 14 that couples to a driveline 90, the operation of which is controlled by a hybrid control module (HCP) 5. The internal combustion engine (engine) 12 includes a rotating crankshaft 11 that rotatably couples to an input member 16 of the transmission 14. As shown, and as described herein, the rotating crankshaft 11 preferably fixedly couples to the input member 16 of the transmission 14 such that rotation of the crankshaft 11 causes a corresponding rotation of the input member 16. Mechanisms through which the crankshaft 11 fixedly couples to the input member 16 include, by way of non-limiting examples, a direct shaft that couples rotations of the crankshaft 11 and the input member 16, meshingly engaged gears that couples rotations of the crankshaft 11 and the input member 16, sprockets and a chain that couples rotations of the crankshaft 11 and the input member 16, or pulleys and a belt that couples rotations of the crankshaft 11 and the input member 16. Furthermore, the crankshaft 11 fixedly couples to the input member 16 without an intervening clutch, torque converter device or other device that is capable of decoupling rotation of the engine crankshaft 11 from the corresponding rotation of the input member 16 of the transmission 14. As described herein, a device that is capable of decoupling rotation of the engine crankshaft 11 from the input member 16 of the transmission 14 includes any device that is capable of permitting rotation of the engine crankshaft 11 at rotational speeds that differ from the corresponding rotational speed of the input member 16 taking into account any relevant gearing ratios.

The transmission 14 includes first and second planetary gear sets 40, 50, respectively, having elements that rotatably couple to first and second torque machines 20, 22, respectively. Planetary gear set 40 includes sun gear 42, carrier member 44 and ring gear 48. The carrier member 44 rotatably supports a plurality of pinion gears 46 that mesh with the sun gear 42, and the ring gear 48 meshes with the pinion gears 46. Planetary gear set 50 includes sun gear 52, carrier member 54 that rotatably supports a plurality of pinion gears 56 that mesh with the sun gear 52, and the ring gear 58 meshes with the pinion gears 56. Rotor hub 35 rotates in concert with the sun gear 52 through an intermediate sleeve shaft 64. In one embodiment and as described herein, the transmission 14 is an electro-mechanical transmission device wherein the first and second torque machines 20, 22 are electrically powered motor/generators. It is appreciated that the torque machines may instead employ hydraulic power, pneumatic power, or another suitable power source to generate torque within the scope of the concepts described in this disclosure. It is further appreciated that the concepts described herein are not limited to transmissions employing only first and second simple planetary gear sets, but may also advantageously apply to transmissions employing any plurality of simple or complex planetary gear sets or other gear train configurations, so long as the rotating crankshaft 11 fixedly couples to the input member 16 of the transmission 14 without an intervening clutch, torque converter device or other device that is capable of decoupling rotation of the engine crankshaft 11 from the corresponding rotation of the input member 16 of the transmission 14.

The first torque machine 20 and the second torque machine 22 are packaged within a case housing/ground 24 and rotatably couple between the input member 16 and a transmission output member 26 that reacts with a driveline 90. The first torque machine 20 includes an annular stator 30 grounded to the transmission casing 24 and an annular rotor 32 supported on a rotatable rotor hub 34. The second torque machine 22 includes an annular stator 31 grounded to the transmission casing 24 and an annular rotor 33 supported on a rotatable rotor hub 35. A high-voltage battery 13 supplies electric power to a power inverter 17 that electrically connects with the first stator 30 via transfer conductors 41 to control operation thereof. The power inverter 17 also electrically connects with the second stator 31 via transfer conductors 43 to control operation of the second torque machine 22 to control operation. The first and second torque machines 20, 22 may operate as motors or generators. Either of the first and second torque machines 20, 22 may operate as an electric motor in which stored electrical power provided by the battery 13 is converted by the power inverter 17 and provided to the respective stator 30, 31 to generate torque. Either of the first and second torque machines 20, 22 may operate as an electric generator in which vehicle momentum may be converted to electrical power stored in the battery 13 or used by the second torque machine 22.

The transmission 14 further includes a first clutch 51 and a second clutch 53. The first clutch 51 is a grounding clutch or brake that is selectively activated to ground the ring gear member 58 to the transmission casing 24. The input member 16 is axially spaced from and not concentric with shaft 60, which couples the carrier member 44 of the first planetary gear set 40 and the carrier member 54 of the second planetary gear set 50. Shaft 72 is preferably coaxial with the input member 16, which couples to hub member 70 to couple with the input member 16 for common rotation with the ring gear 48. Shaft 62 couples rotor hub 34 with sun gear 42 via hub member 37 and an axially-extending portion 39.

The second clutch 53 nests between an axially extending portion 39, hub 37 and shaft 62. A hub member 77 couples with the second clutch 53. A separate sleeve shaft 60 concentric with shaft 62 couples carrier member 54 and hub members 68 and 69 to carrier member 44, and thus fixedly couples rotation of the carrier member 44 to rotation of the carrier member 54. Sleeve shaft 64 couples rotor hub 35 with sun gear 52. Axially-extending member 78, hub 77 and axially-extending member 79, which is an annular shaft, couples the second clutch 53 with the first clutch 51 and ring gear 58. Axial-extending member 78 circumscribes the planetary gear set 50. The ring gear member 58 decouples from the sun gear member 42 when the second clutch 53 is deactivated.

The transmission 14 selectively operates in fixed-gear modes and variable modes, with the variable modes being electrically-variable modes in one embodiment. Transmission operation in a fixed-gear mode includes any operation wherein the rotational speed of the output member 26 is a direct ratio of the rotational speed of the input member 16. The transmission 14 operates in one fixed-gear mode at a first gear ratio by activating both the first and second clutches 51, 53. The transmission 14 operates in an engine-off fixed-gear mode at a second gear ratio by activating the first clutch 51 in combination with the engine 12 being in an OFF state under conditions as described herein. The first gear ratio and the second gear ratio may be determined based upon the gear ratios of the first and second planetary gear sets 40, 50. Transmission operation in one of the variable modes includes any operating condition wherein the rotational speed of the output member 26 is determined based upon the speed of the input member 16 in combination with rotational speeds of the first and second torque machines 20, 22, the gear ratios of the planetary gear sets 40, 50, activation states of the first and second clutches 51, 53 and other factors.

The HCP 5 communicates with an engine control module (ECM) 23, the inverter controller 15, and a transmission control module (TCM) 21, along with other devices. The HCP 5 provides supervisory control over the ECM 23 and the inverter controller 15 and an operator interface device 6 that receives commands from a vehicle operator. The HCP 5 coordinates torque commands amongst the engine 12 and the first and second torque machines 20, 22 to establish a net zero output torque condition during neutral operation of the transmission 14 in response to an operator input to the operator interface device 6. The HCP 5 coordinates torque commands amongst the engine 12 and the first and second torque machines 20, 22 to control output torque in response to an operator torque request input to the operator interface device 6.

The operator interface device 6 includes one or a plurality of devices through which the operator commands operation of the vehicle and powertrain system, including, e.g., an accelerator pedal, a brake pedal, an ignition key, a transmission range selector, cruise control, and other related devices. The operator interface device 6 generates commands for operating the powertrain system, including, e.g., a powertrain ON/OFF state, a transmission range selection, e.g., one of Park, Reverse, Neutral and Drive, an operator torque request, an operator vehicle speed request, and other related commands. The operator interface device 6 is shown as a unitary device for ease of illustration.

The power inverter module 17 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) or other suitable power switching devices for converting DC power from the battery 13 to AC power for powering respective ones of the first and second torque machines 20, 22 by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors and transform it to or from three-phase AC power, which is conducted to or from the first and second torque machines 20, 22 for operation as motors or generators via transfer conductors. The inverter controller 15 controls the power inverter module 17 to transfer electrical power to and from the first and second torque machines 20, 22 in response to the motor torque commands. Electrical current is transferred across the high-voltage electrical bus to and from the battery 13 to charge and discharge the battery 13.

The ECM 23 operatively connects to the engine 12, and functions to acquire data from sensors and send actuator commands to the engine 12 over a plurality of discrete lines or other suitable communication links. The ECM 23 monitors engine speed and load, which are communicated to the HCP 5. The inverter controller 15 monitors and controls a first motor torque of the first torque machine 20 and a second motor torque of the second torque machine 22. Alternatively, two electronic controllers can be utilized, with each controller monitoring respective ones of the first and second torque machines 20, 22, respectively. The TCM 21 monitors rotational speeds and controls activation and deactivation of the first and second clutches 51, 53.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The engine 12 is configured to operate in an ON state, an OFF state and a fuel cutoff (FCO) state. When operating in the ON state, the engine 12 is fueled and fired, thus spinning and generating sufficient torque to maintain engine operation at or near an idle speed. When operating in the FCO state, the engine is unfueled and unfired, but is spinning and consuming some amount of powertrain torque. When in the OFF state, the engine 12 is unfueled, unfired, and not spinning, i.e., its rotational speed is zero. When the engine 12 is in the OFF state, the engine 12 has an engine reactive torque, which is defined as a frictional moment that is required to overcome various internal engine frictions and pressures to initiate spinning the engine 12 when the engine 12 is in the OFF state. The engine reactive torque includes bearing frictions for the camshaft and crankshaft, piston pumping resistance, piston friction, valve spring compressions, spin losses and other rotational inertias associated with the various components, accessory and other belts, and other related forces that resist engine rotation. The maximum torque value of the engine reactive torque is functionally equivalent to a clutch torque capacity. The engine reactive torque can be exerted in either rotational direction, and the maximum value of the engine reactive torque may be direction-specific. The maximum value of the engine reactive torque may vary, with the variation due to temperatures of the various moving components of the engine 12 and lubricity of lubricating fluids employed in the engine 12. Engine oil temperature and/or engine coolant temperature may be monitored and employed as a proxy to dynamically estimate or otherwise determine the maximum value of the engine reactive torque during operation of the powertrain system 10.

The powertrain system 10 described herein may operate with the transmission 14 in the engine-off fixed-gear mode by activating the first clutch 51 in combination with the engine 12 being in an OFF state under selected conditions described herein. Operating the transmission 14 in the engine-off fixed-gear mode includes the engine 12 being in the OFF state, activating the first clutch C1 51 to ground the second ring gear 58 to the transmission case 24 and operating the first torque machine 20 to generate a drag torque while taking into account and using a reactive torque generated by the engine 12, and controlling the second torque machine 22 to generate a second output torque that is responsive to an operator torque request, wherein rotational speed of the output member 26 is a direct ratio of the rotational speed of the second torque machine 22. Such operation includes controlling the second torque machine 22 to generate the second torque output responsive to the operator torque request and the drag torque, and controlling the first torque machine 20 to generate a first torque output that is responsive to the drag torque, wherein a magnitude of the first torque output is offset by a magnitude of the engine reactive torque in the OFF state. As is appreciated, drag and drag torque refer to forces acting in opposition to commanded movements of the various elements of the powertrain system 10 acting in response to the operator torque request. This may include employing the engine reactive torque in combination with a reactive torque from the first torque machine 20 to provide the necessary reactive torques through the first and second planetary gear sets 40, 50 to permit the second torque machine 22 to generate propulsion torque at the output member 26 while minimizing electric power consumed by the first torque machine 20 to achieve the engine reactive torque while keeping the engine 12 in the OFF state, i.e., not rotating. This may include employing only the engine 12 in the OFF state to supply the engine reactive torque to provide the necessary reactive torques through the first and second planetary gear sets 40, 50 to permit the second torque machine 22 to generate propulsion torque at the output member 26 with the first torque machine 20 in a free-spin condition. The first torque machine 20 is in a free-spin condition when the associated inverter circuit in the power inverter 17 is deactivated. So long as the combination of the various torques does not overcome the engine reactive torque, thus causing the engine 12 to spin, the transmission 20 may operate in the engine-off fixed-gear mode. The benefits that may accrue from operating in the engine-off fixed-gear mode include reducing total electric power consumption when the efficiency of the first torque machine 20 is less than the efficiency of the second torque machine 22.

Figure 2:
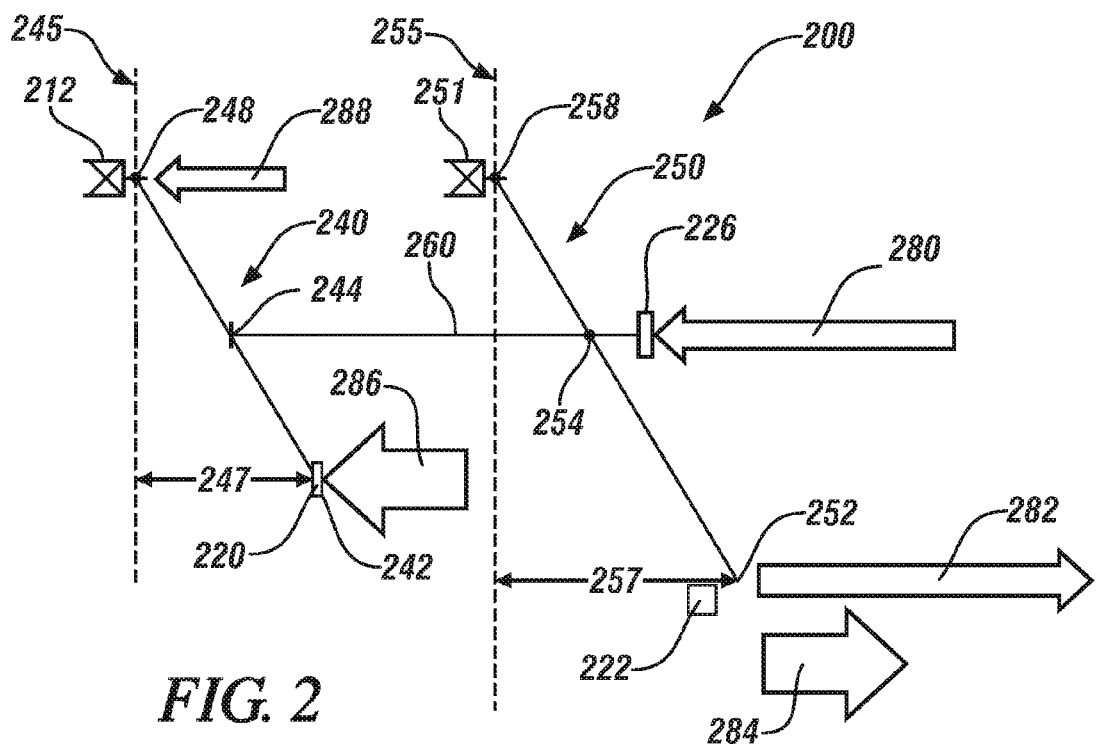
FIG. 2 graphically illustrates a lever diagram showing power flow and relative rotational speeds through elements of an embodiment of the powertrain system described with reference to FIG. 1 during operation in an engine-off fixed-gear mode.

FIG. 2 graphically illustrates a lever diagram 200 showing power flow and relative rotational speeds through elements of an embodiment of the powertrain system 10 described with reference to FIG. 1 during operation in the engine-off fixed-gear mode. The powertrain system includes transmission 214 including first and second torque machines 220, 222, respectively and first and second planetary gear sets 240, 250, respectively, engine 212, and output member 226. The lever diagram 200 includes a plurality of nodes indicating relative gear ratios of planetary gear sets on vertical axes and relative rotational speeds and torque vectors associated with the nodes on a horizontal axis. As used herein, "Motor A" and related terms describe operation related to the first torque machine 220, e.g., Motor A torque, which describes magnitude of torque output from the first torque machine 220. As used herein, "Motor B" and related terms describe operation related to the second torque machine 222, e.g., Motor B torque, which describes magnitude of torque output from the second torque machine 222. Torque vectors include an output torque 280, motor B propulsion torque 282, Motor B drag compensation torque 284, Motor A drag/inertial torque 286 and engine reactive torque 288. The engine reactive torque 288 is considered a pseudo-clutch torque that may be employed during powertrain operation to supplement or completely supplant the Motor A drag/inertial torque 286 during operation in the engine-off fixed-gear mode.

The first planetary gear 240 includes nodes 242, 244 and 248 shown in context of a first vertical axis 245, which correspond to sun gear 42, carrier member 44 and ring gear 48 of the first planetary gear set 40 of the transmission 14 described with reference to FIG. 1. The second planetary gear 250 includes nodes 252, 254 and 258 shown in context of a second vertical axis 255, which correspond to sun gear 52, carrier member 54 and ring gear 58 of the second planetary gear set 50 of the transmission 14 described with reference to FIG. 1. Node speeds are indicated by their horizontal distances from their respective first or second vertical axes 245, 255.

The transmission 214 includes node 242 that rotatably couples to the first torque machine 220, node 244 the rotatably couples to node 254 via rotating member 260, node 248 that couples to the engine 212, node 252 that couples to the second torque machine 222, node 254 that rotatably couples to the output member 226, and node 258 that selectively couples to first clutch C1 251. Rotating member 260 corresponds to the member 60 and couples rotation of the first carrier member 44 to rotation of the second carrier member 54. The lever diagram 200 depicts operation that includes the powertrain operable in the engine-off fixed-gear mode. This includes the engine 212 in the OFF state, i.e., not rotating, and with clutch C1 251 activated, thus grounding its rotation to the transmission case 24. As such, nodes 248 and 258 are at zero speed, and the speeds of the remaining nodes 242, 244, 252 and 254 are interrelated and directly dependent upon the gear ratios between the various nodes 242, 244, 248, 252, 254 and 258. This includes Motor A speed 247 and Motor B speed 257, which are directly linked and directly linearly relate to the speed at node 254, and thus directly linearly relate to the speed of the output member 226.

An embodiment of the powertrain system 10 described with reference to FIG. 1 may operate the transmission 14 in a fixed-gear mode by activating both the first and second clutches 51, 53, and may operate the transmission in a variable mode by activating one of the first and second clutches 51, 53. The powertrain system 10 may operate in an engine-off fixed-gear mode at a second gear ratio defined between Motor B speed 257 and the speed of the output member 226 by activating the first clutch 51 with the engine 12 in the OFF state and controlling the first torque machine 20 to generate Motor A torque that is responsive to a drag torque. The Motor A torque is offset by the engine reactive torque with the engine 12 in the OFF state. The second torque machine 22 is controlled to generate a Motor B torque that is responsive to an operator torque request, and the rotational speed of the output member 226 is determined based upon Motor B speed 257.

Figure 3:
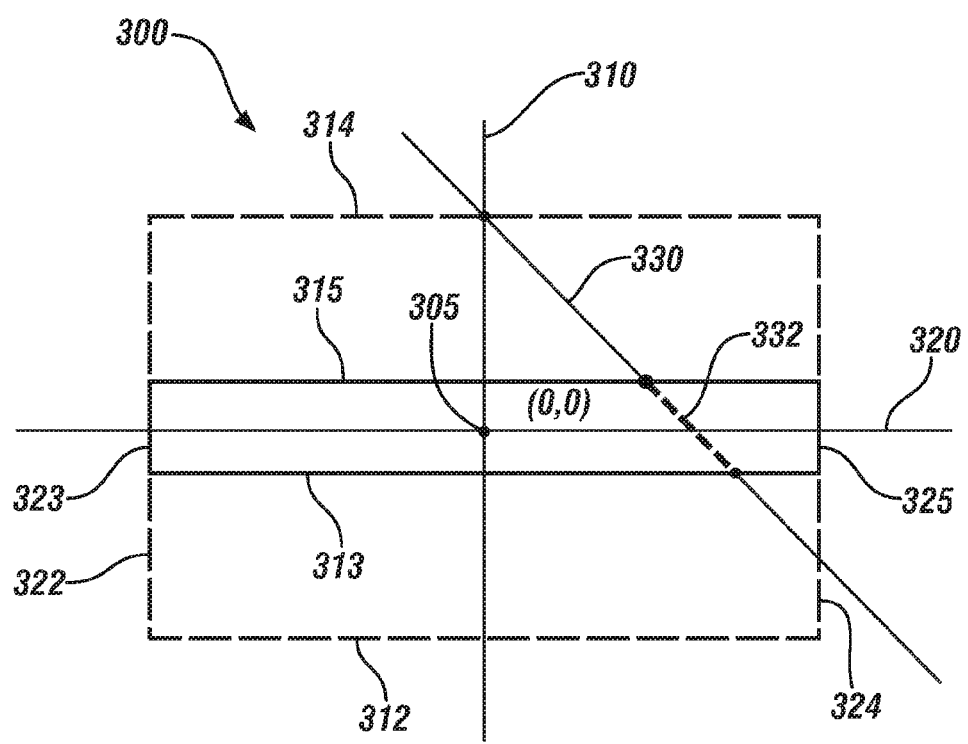
FIG. 3 graphically shows torque outputs associated with an embodiment of the powertrain system described herein, including Motor A torque in relation to Motor B torque, and including a line indicating commanded output torque and a line segment that indicates a portion of the commanded output torque that is achievable during operation in the engine-off fixed-gear mode, in accordance with the disclosure.

FIG. 3 graphically shows torque control operations 300 associated with an embodiment of the powertrain system 10 described herein, including Motor A torque on the vertical axis 310 and Motor B torque on the horizontal axis 320. One of the controllers described with reference to FIG. 1, e.g., HCP 5 includes an executable control routine and associated calibration to control operation of the powertrain system 10 in the engine-off fixed-gear mode by activating only one of the clutches, e.g., the first clutch C1 51 in combination with the engine 12 being in an OFF state.

A point of origin 305 indicates a 0,0 torque point, i.e., Motor A torque is equal to zero and Motor B torque is equal to zero. A positive, tractive torque is indicated when Motor A torque is greater than the point of origin 305 and a negative, reactive torque is indicated when Motor A torque is less than the point of origin 305. Likewise, a positive, tractive torque is indicated when Motor B torque is greater than the point of origin 305, and a negative, reactive torque is indicated when Motor B torque is less than the point of origin 305. All instances of positive, tractive torque are associated with operating a torque machine to consume electric power to generate positive torque, e.g., forward propulsion in a vehicle, and all instances of negative, reactive torque are associated with operating a torque machine to generate electric power to provide reactive torque effort, e.g., braking in a vehicle.

Minimum Motor A torque 312, maximum Motor A torque 314, minimum Motor B torque 322 and maximum Motor B torque 324 are shown. Also shown herein are a minimum inertial Motor A torque 313 and a maximum inertial Motor A torque 315, and corresponding minimum inertial Motor B torque 323 and maximum inertial Motor B torque 325. The minimum inertial Motor A torque 313 and the maximum inertial Motor A torque 315 correspond to and are based upon the engine reactive torque, with the minimum inertial Motor A torque 313 associated with the engine reactive torque in a first rotational direction and the maximum inertial Motor A torque 315 associated with the engine reactive torque in a second, opposite rotational direction. The engine reactive torque may vary during engine operation, and the engine oil temperature and/or engine coolant temperature may be monitored and employed as a proxy to estimate or otherwise determine a maximum value of the engine reactive torque, and thus determine the minimum inertial Motor A torque 313 and the maximum inertial Motor A torque 315 that can be achieved while operating the powertrain 10 in the engine-off fixed-gear mode.

Line 330 indicates a commanded output torque, and further indicates combinations of magnitudes of Motor A torque and Motor B torque that can be commanded to achieve the commanded output torque. Line 330 is one example of a magnitude of constant output torque. It is appreciated that there can be a plurality of lines shown that are parallel to Line 330 and indicate an increased magnitude or a decreased magnitude of the commanded output torque. The relation between magnitudes of Motor A torque and Motor B torque to achieve the commanded output torque can be expressed in equation form, as follows:

$$To = K1 * Ta + K2 * Tb \quad [1]$$

wherein:
To represents output torque,
Ta represents Motor A torque,
Tb represents Motor B torque,
K1 represents a first gear ratio associated with the first planetary gear set 40 and
K2 represents a second gear ratio associated with the second planetary gear set 50.

Line segment 332 indicates that portion of the commanded output torque shown by line 330 that is achievable without exceeding the minimum inertial Motor A torque 313 and the maximum inertial Motor A torque 315, i.e., during operation in the engine-off fixed-gear mode for the commanded output torque. The combinations of magnitudes of Motor A torque and Motor B torque that achieve the commanded output torque are plotted on line segment 332. Thus, any one of the combinations of magnitudes of Motor A torque and Motor B torque captured on line segment 332 can be implemented to operate the powertrain system 10 in the engine-off fixed-gear mode under operating conditions that include the engine 10 in the OFF state, with Motor A and Motor B working together to achieve the commanded output torque while operating in the fixed-gear mode. The electrical power consumption may not be constant across line segment 332. Therefore, creating the line segment 332 in the manner described herein including a weak clutch model that includes treating the engine reactive torque as functionally equivalent to clutch torque capacity allows one of the controllers to choose a combination of Motor A torque and Motor B torque along line segment 332 that minimizes power consumption. Electrical power losses associated with operation of an embodiment of the powertrain system 10 described herein may be reduced by modelling the engine in the OFF state as a weak clutch, which allows the control system to recognize when motor intervention to maintain engine speed at zero is required for engine speed control and when it can be ignored for fuel economy. The motor torque commands can be determined even with small torques due to inertia effects and spin losses, thus reducing electrical energy consumption.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a powertrain system including an internal combustion engine fixedly coupled to an input member of a multi-mode transmission including first and second torque machines, wherein the multi-mode transmission operates in one of a plurality of fixed-gear and variable modes to transfer torque to an output member through selective activation of first and second clutches, the method comprising:
in response to a command to operate the multi-mode transmission:
activating only the first clutch,
commanding the internal combustion engine to an OFF state,
determining engine reactive torque with the engine in the OFF state based upon an engine oil temperature;
controlling the first torque machine to generate a first torque output responsive to a drag torque, wherein the first torque output is offset by the engine reactive torque with the engine in the OFF state, and
operating the multi-mode transmission by controlling the second torque machine to generate a second torque output responsive to an operator torque request and the first torque output of the first torque machine.

2. The method of claim 1, wherein the internal combustion engine fixedly coupled to the input member of the multi-mode transmission comprises the internal combustion engine rotatably coupled to the input member of the multi-mode transmission without an intervening device capable of decoupling rotation of the engine crankshaft from a corresponding rotation of the input member.

3. The method of claim 1, further comprising first and second planetary gears each including a sun gear, a carrier member rotatably supporting a plurality of pinion gears, and ring gears, and the first carrier member rotatably coupled to the second carrier member; and wherein activating only the first clutch comprises grounding the ring gear of the second planetary gear to a transmission case.

4. The method of claim 1, wherein controlling the first torque machine to generate a first torque output responsive to a drag torque, wherein the first torque output is offset by an engine reactive torque with the engine in the OFF state comprises reducing the first torque output by an amount equal to the engine reactive torque.

5. The method of claim 1, wherein operating the multi-mode transmission further comprises the rotational speed of the output member being a direct ratio of a rotational speed of the second torque machine.

6. A method for controlling a powertrain system including an internal combustion engine having a crankshaft that fixedly couples to an input member of a multi-mode transmission including first and second torque machines, wherein the multi-mode transmission operates in one of a plurality of fixed-gear and variable modes to transfer torque to an output member through selective activation of first and second clutches, the method comprising:
    operating the powertrain system with the internal combustion engine in an OFF state; and
    operating the multi-mode transmission in an engine-off fixed-gear mode, including:
        activating only the first clutch,
        determining an engine reactive torque with the engine in the OFF state based upon engine oil temperature, and
        operating the multi-mode transmission by controlling the second torque machine to generate a second torque output responsive to an operator torque request and the engine reactive torque with the internal combustion engine in the OFF state.

7. The method of claim 6, wherein operating the multi-mode transmission in the engine-off fixed-gear mode further comprises controlling the first torque machine to generate a first torque output responsive to a drag torque, wherein the first torque output is offset by the engine reactive torque with the engine in the OFF state; and
    wherein operating the multi-mode transmission by controlling the second torque machine to generate a second torque output responsive to an operator torque request and an engine reactive torque comprises operating the multi-mode transmission by controlling the second torque machine to generate a second torque output responsive to the operator torque request and the first torque output.

8. The method of claim 7, wherein controlling the first torque machine to generate the first torque output responsive to the drag torque, wherein the first torque output is offset by an engine reactive torque with the engine in the OFF state comprises reducing the first torque output offset by an amount equal to the engine reactive torque.

9. The method of claim 6, wherein operating the multi-mode transmission in the engine-off fixed-gear mode further comprises commanding the first torque machine to a free-spin condition; and
    wherein operating the multi-mode transmission by controlling the second torque machine to generate a second torque output responsive to an operator torque request and an engine reactive torque comprises operating the multi-mode transmission by controlling the second torque machine to generate a second torque output responsive to the operator torque request with the first torque machine in the free-spin condition.

10. The method of claim 6, wherein the internal combustion engine having a crankshaft that fixedly couples to the input member of the multi-mode transmission comprises the crankshaft of the internal combustion engine rotatably coupled to the input member of the multi-mode transmission without an intervening device capable of decoupling rotation of the engine crankshaft from a corresponding rotation of the input member.

11. The method of claim 6, further comprising first and second planetary gears each including a sun gear, a carrier member rotatably supporting a plurality of pinion gears, and ring gears, and the first carrier member rotatably coupled to the second carrier member; and wherein activating only the first clutch comprises grounding the ring gear of the second planetary gear to a transmission case.

12. The method of claim 6, wherein operating the multi-mode transmission further comprises the rotational speed of the output member being a direct ratio of a rotational speed of the second torque machine.

13. A powertrain system, comprising:
    an internal combustion engine having a crankshaft that fixedly couples to an input member of a multi-mode transmission, wherein the internal combustion engine has a rotational speed of zero when in an OFF state;
    the multi-mode transmission including first and second torque machines, first and second planetary gears and first and second clutches, wherein the multi-mode transmission is operative by activating both the first and second clutches, and operative in one of a plurality of variable modes by activating one of the first and second clutches; and
    a controller including an executable routine to operate the transmission in an engine-off fixed-gear mode, the routine including steps to:
        control the engine to the OFF state;
        activate only the first clutch,
        determine a first torque output responsive to a drag torque;
        determine an engine reactive torque with the engine in the OFF state;
        control the first torque machine to generate the first torque output responsive to the drag torque, wherein the first torque output is offset by the engine reactive torque with the engine in the OFF state, and
        control the second torque machine to generate a second torque output responsive to an operator torque request and the first torque output that is offset by the engine reactive torque.

14. The powertrain system of claim 13, wherein the internal combustion engine having a crankshaft that fixedly couples to the input member of the multi-mode transmission comprises the internal combustion engine having a crankshaft rotatably coupled to the input member of the multi-mode transmission without an intervening device capable of decoupling rotation of the crankshaft from a corresponding rotation of the input member.

15. The powertrain system of claim 13, further comprising the first and second planetary gears each including a sun gear, a carrier member rotatably supporting a plurality of pinion gears, and ring gears, and the first carrier member rotatably coupled to the second carrier member; and wherein activating only the first clutch comprises grounding the ring gear of the second planetary gear to a transmission case.

\* \* \* \* \*